US012731743B2

(12) United States Patent
Kozono et al.

(10) Patent No.: US 12,731,743 B2
(45) **Date of Patent: *Sep. 8, 2026**

(54) VEHICLE OPERATION INPUT DEVICE, VEHICLE OPERATION INPUT METHOD, NON-TRANSITORY RECORDING MEDIUM

(71) Applicant: TOYOTA JIDOSHA KABUSHIKI KAISHA, Toyota (JP)

(72) Inventors: Yuki Kozono, Okazaki (JP); Shu Nakajima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 88 days.

This patent is subject to a terminal disclaimer.

(21) Appl. No.: 18/806,973

(22) Filed: Aug. 16, 2024

(65) Prior Publication Data

US 2024/0399864 A1 Dec. 5, 2024

Related U.S. Application Data

(63) Continuation of application No. 17/885,899, filed on Aug. 11, 2022, now Pat. No. 12,097,763.

(30) Foreign Application Priority Data

Sep. 29, 2021 (JP) ................................ 2021-159806

(51) Int. Cl.

| | |
|---|---|
| ***B60K 35/23*** | (2024.01) |
| ***B60K 35/10*** | (2024.01) |
| ***B60K 35/22*** | (2024.01) |
| ***B60K 35/50*** | (2024.01) |
| ***H01H 3/02*** | (2006.01) |
| ***H01H 13/705*** | (2006.01) |
| *B60K 35/29* | (2024.01) |
| *B60K 35/60* | (2024.01) |

(52) U.S. Cl.

CPC ........... *H01H 13/705* (2013.01); *B60K 35/10* (2024.01); *B60K 35/22* (2024.01); *B60K 35/23* (2024.01);

(Continued)

(58) Field of Classification Search

CPC ........ B60K 35/10; B60K 35/23; B60K 35/50; B60K 35/22; B60K 35/29; B60K 35/09; B60K 35/60; H01H 3/02; H01H 3/705

See application file for complete search history.

(56) References Cited

U.S. PATENT DOCUMENTS 8,106,783 B2 * 1/2012 Wada .................. B60K 35/265 348/78
11,643,100 B2 5/2023 Shiba et al.

(Continued)

FOREIGN PATENT DOCUMENTS

CN 110884556 A 3/2020
CN 112776600 A 5/2021

(Continued)

OTHER PUBLICATIONS

U.S. Appl. No. 17/591,745, filed Feb. 3, 2022.
Jun. 25, 2024 Notice of Allowance issued in U.S. Appl. No. 17/885,899.

*Primary Examiner* — Tan Q Nguyen
(74) *Attorney, Agent, or Firm* — Oliff PLC

(57) ABSTRACT

When an occupant has performed a specific operation that is an operation different to an input operation on a state switching section while in a state in which a display section capable of displaying information related to an input section is not displaying the information, a processor causes the information to be displayed on the display section and places the input section in an input enabled state in which the input operation is receivable. Moreover, when the occupant has not performed the specific operation on the state switching section while in state in which the information is not being displayed on the display section, the processor does not cause the information to be displayed on the display section.

12 Claims, 8 Drawing Sheets

(52) U.S. Cl.
CPC ............... *B60K 35/50* (2024.01); *H01H 3/02* (2013.01); *B60K 35/29* (2024.01); *B60K 35/60* (2024.01); *B60K 2360/1446* (2024.01); *B60K 2360/195* (2024.01); *B60K 2360/197* (2024.01); *B60K 2360/782* (2024.01); *H01H 2003/0293* (2013.01); *H01H 2217/032* (2013.01); *H01H 2231/026* (2013.01)

(56) References Cited

U.S. PATENT DOCUMENTS

2009/0164062 A1 6/2009 Aoki et al.
2009/0231145 A1 9/2009 Wada et al.
2014/0168130 A1* 6/2014 Hirai ......................... G06F 3/02 345/173
2016/0357287 A1 12/2016 Bannai et al.
2017/0282717 A1* 10/2017 Jang .................... G06F 3/04883
2018/0086206 A1 3/2018 Mizuno et al.
2019/0107934 A1 4/2019 Kakinuma et al.
2019/0391736 A1 12/2019 Tanaka
2021/0138903 A1 5/2021 Kozono et al.

FOREIGN PATENT DOCUMENTS

JP 2007-106353 A 4/2007
JP 2007-290562 A 11/2007
JP 2014-172413 A 9/2014
JP 2015099436 A 5/2015
JP 2019070990 A 5/2019
WO 2019111515 A1 6/2019

* cited by examiner 10
14
16
18
20
22
22A
22B
22C1
22C2
22C3
HA
33R(100)
33L(100)
34R
34R1
34R2
34R3
34R4
34L
34L1
34L2
34L3
34L4
36R
36R1
36R2
36L
36L1
36L2
38R
38L
60R
60L

VEHICLE OPERATION INPUT DEVICE, VEHICLE OPERATION INPUT METHOD, NON-TRANSITORY RECORDING MEDIUM

CROSS-REFERENCE TO RELATED APPLICATION

This is a Continuation of U.S. patent application Ser. No. 17/885,899 filed Aug. 11, 2022 (now U.S. Pat. No. 12,097,763), which in turn is based on and claims priority under 35 USC 119 from Japanese Patent Application No. 2021-159806 filed on Sep. 29, 2021. The disclosure of each of the above-identified prior applications is hereby incorporated by reference herein in its entirety.

BACKGROUND

Technical Field

The present disclosure relates to a vehicle operation input device, a vehicle operation input method, and a non-transitory recording medium.

Related Art

Japanese Patent Application Laid-Open (JP-A) No. 2007-290562 discloses an invention in which a display section performs emphasis display of an image representing a function assigned to a portion of a steering switch provided to a steering wheel of a vehicle when a finger on a hand of an occupant either touches or gets near to this portion.

In the invention of JP-A No. 2007-290562, sometimes the finger on the hand of the occupant may either touch or be placed near to the portion of the steering switch by the occupant unintentionally. Due to the display section performing emphasis display of the image representing the function assigned to this portion in such cases, the invention of JP-A No. 2007-290562 readily makes the occupant looking at the display section feel annoyed.

In consideration of the above circumstances, an object of the present disclosure is to obtain a vehicle operation input device, a vehicle operation input method, and a non-transitory recording medium that are not likely to make an occupant looking at the display section feel annoyed.

SUMMARY

A vehicle operation input device of a first aspect of the present disclosure includes an input section on which an input operation is performed, the input operation being an operation in which a part of a body of an occupant of a vehicle touches the input section, a state switching section configured to be operated by the occupant, and a processor. When the occupant has performed a specific operation that is an operation different to the input operation on the state switching section while in a state in which a display section capable of displaying information related to the input section is not displaying the information, the processor causes the information to be displayed on the display section and places the input section in an input enabled state in which the input operation is receivable. Moreover, when the occupant has not performed the specific operation on the state switching section while in state in which the information is not being displayed on the display section, the processor does not cause the information to be displayed on the display section and places the input section in an input disabled state in which the input operation is not receivable.

In the vehicle operation input device of the first aspect of the present disclosure, when the occupant has performed the specific operation on the state switching section while in a state in which the information related to the input section is not being displayed on the display section, the information related to the input section is displayed on the display section and the input section is placed in the input enabled state in which the input operation by the occupant is receivable. However, when the occupant has not performed the specific operation on the state switching section while in state in which the information related to the input section is not being displayed on the display section, the information related to the input section is not displayed on the display section and the input section is placed in the input disabled state in which the input operation is not receivable. The input section accordingly are not switched to the input enabled state unless the occupant performs the specific operation different to the input operation on the state switching section.

Thus in order for the specific operation to be performed by the occupant in this manner, normally the occupant needs to have the intention to display the information related to the input section on the display section. Thus there is little concern that the information related to the input section is displayed on the display section in cases in which the occupant does not have the intention to display information related to the input section on the display section. The vehicle operation input device of the first aspect of the present disclosure is accordingly not likely to make an occupant looking at the display section feel annoyed.

A vehicle operation input device according to a second aspect of the present disclosure is the first aspect wherein the state switching section is the input section.

In the second aspect of the present disclosure, the information related to the input section is displayed on the display section when the occupant has performed the specific operation and the input operation on the input section. This means that the occupant can display the information related to the input section on the display section more simply than cases in which the input section and the state switching section are different sections.

A vehicle operation input device according to a third aspect of the present disclosure is the first aspect of the present disclosure, wherein the state switching section, which is the input section, is able to move between an initial position that is a position when not imparted with an external force and a pressed position, and the specific operation is an operation of continuing to position the input section in the pressed position for a period of time exceeding a first threshold.

In the third aspect of the present disclosure the specific operation is the operation of continuing to position the state switching section that is the input section in the pressed position for the period of time exceeding the first threshold. There is accordingly little concern that the occupant might perform the specific operation mistakenly. The third aspect of the present disclosure enables a reduction in concern that the occupant displays the information related to the input section on the display section mistakenly.

A vehicle operation input device according to a fourth aspect of the present disclosure is the first aspect of the present disclosure, wherein the state switching section is the input section, and the specific operation is an operation in which the part of the body of the occupant continues to touch the input section for a period of time exceeding a second threshold.

In the invention of the fourth aspect of the present disclosure, the specific operation is the operation in which the part of the body of the occupant continues to touch the input section for the period of time exceeding the second threshold. There is accordingly little concern that the occupant might perform the specific operation mistakenly. The fourth aspect of the present disclosure accordingly enables a reduction in concern that the occupant displays the information related to the input section on the display section mistakenly.

A vehicle operation input device according to a fifth aspect of the present disclosure is the first aspect of the present disclosure wherein the input section and the state switching section are different from each other.

In the fifth aspect of the present disclosure the input section and the state switching section are different from each other. Thus the occupant needs to perform the specific operation on the state switching section different to the input section in order to display the information related to the input section on the display section that is currently in a state not displaying the information related to the input section. Thus in order for the occupant to perform the specific operation in this manner, normally the occupant needs to have the intention to display the information related to the input section on the display section. Thus there is little concern that the information related to the input section is displayed on the display section in cases in which the occupant does not have the intention to display the information related to the input section on the display section. The vehicle operation input device of the fifth aspect of the present disclosure is accordingly not likely to make an occupant looking at the display section feel annoyed.

A vehicle operation input device according to a sixth aspect of the present disclosure is the first aspect of the present disclosure, wherein the processor is configured to clear the information from the display section and to switch the input section to the input disabled state when the occupant has not performed the input operation in a period of time from when the information was displayed on the display section until a third threshold elapses.

In the invention of the sixth aspect of the present disclosure, the information related to the input section is cleared from the display section and the input section is switched to the input disabled state when the occupant has not performed the input operation in the period of time from when the information related to the input section was displayed on the display section until the third threshold elapses. Namely, the information related to the input section is cleared from the display section when the occupant does not have the intention to continue display of the information related to the input section on the display section. The vehicle operation input device of the sixth aspect of the present disclosure is accordingly not likely to make an occupant looking at the display section feel annoyed.

A vehicle operation input device according to a seventh aspect of the present disclosure is the first aspect of the present disclosure, wherein the input section and the state switching section are provided to a steering wheel of the vehicle.

In the seventh aspect of the present disclosure, the input section and the state switching section are provided to the steering wheel of the vehicle. This means that in the vehicle operation input device of the seventh aspect of the present disclosure the occupant (driver) is able to operate the input section and the state switching section easily.

A vehicle operation input device according to an eighth aspect of the present disclosure is the seventh aspect of the present disclosure wherein a first operation section equipped with the input section and the state switching section, and a second operation section equipped with the input section and the state switching section and positioned at a left side or a right side of the first operation section, are both provided to the steering wheel.

In the eighth aspect of the present disclosure the first operation section equipped with the input section and the state switching section, and the second operation section equipped with the input section and the state switching section and positioned at a left side or a right side of the first operation section, are both provided to the steering wheel. This means that the occupant (driver) is able to operate the input section and the state switching section more easily than is cases in which only one set of the first operation section and the second operation section is provided to the steering wheel.

A vehicle operation input device according to a ninth aspect of the present disclosure is the eighth aspect of the present disclosure, wherein the processor displays information related to the input section of the first operation section on the display section when the occupant has performed the specific operation on the state switching section of the first operation section.

In the ninth aspect of the present disclosure, the information related to the input section of the first operation section is displayed on the display section when the occupant has performed the specific operation on the state switching section of the first operation section. This means that in the vehicle operation input device of the ninth aspect of the present disclosure, the occupant looking at the display section is accordingly less likely to feel annoyed than in cases in which the information related to the input section of the second operation section is displayed on the display section when the occupant has performed the specific operation on the state switching section of the first operation section.

A vehicle operation input device according to a tenth aspect of the present disclosure is the ninth aspect of the present disclosure wherein the processor causes information related to the input section of the second operation section to be displayed on the display section when the occupant has performed the input operation on the input section of the second operation section while in a state in which information related to the input section of the first operation section is being displayed on the display section.

In the tenth aspect of the present disclosure the information related to the input section of the second operation section is displayed on the display section when the occupant has performed the input operation on the input section of the second operation section while in a state in which the information related to the input section of the first operation section is being displayed on the display section. This accordingly enables the occupant to display the information related to the input section of the second operation section on the display section using a simple operation while in a state in which the information related to the input section of the first operation section is being displayed on the display section.

A vehicle operation input method according to an eleventh aspect of the present disclosure includes, when an occupant of a vehicle has, while in a state in which a display section capable of displaying information related to an input section on which an input operation is performed by the occupant is not displaying the information, performed a specific operation that is an operation different to the input operation on the state switching section, a processor causing the information to be displayed on the display section and placing the input section in an input enabled state in which the input operation is receivable. The vehicle operation input method also includes, when the occupant has not performed the specific operation on the state switching section while in state in which the information is not being displayed on the display section, the processor not causing the information to be displayed on the display section and placing the input section in an input disabled state in which the input operation is not receivable.

A non-transitory recording medium according to a twelfth aspect of the present disclosure is a non-transitory recording medium storing a program executable by a computer so as to perform processing. The processing includes when an occupant of a vehicle has, while in a state in which a display section capable of displaying information related to an input section on which an input operation is performed by the occupant is not displaying the information, performed a specific operation that is an operation different to the input operation on a state switching section, displaying the information on the display section and placing the input section in an input enabled state in which the input operation is receivable. The processing also includes when the occupant has not performed the specific operation on the state switching section while in state in which the information is not being displayed on the display section, not displaying the information on the display section and placing the input section in an input disabled state in which the input operation is not receivable.

As described above, the vehicle operation input device, vehicle operation input method, and the non-transitory recording medium according to the present disclosure exhibit the excellent advantageous effect of making it unlikely that an occupant looking at a display section would feel annoyed.

BRIEF DESCRIPTION OF THE DRAWINGS

Exemplary embodiments of the present invention will be described in detail based on the following figures, wherein.

DETAILED DESCRIPTION

Description follows regarding exemplary embodiments of a vehicle operation input device, a vehicle operation input method, and a non-transitory recording medium according to the present disclosure, with reference to the drawings.

Figure 1:
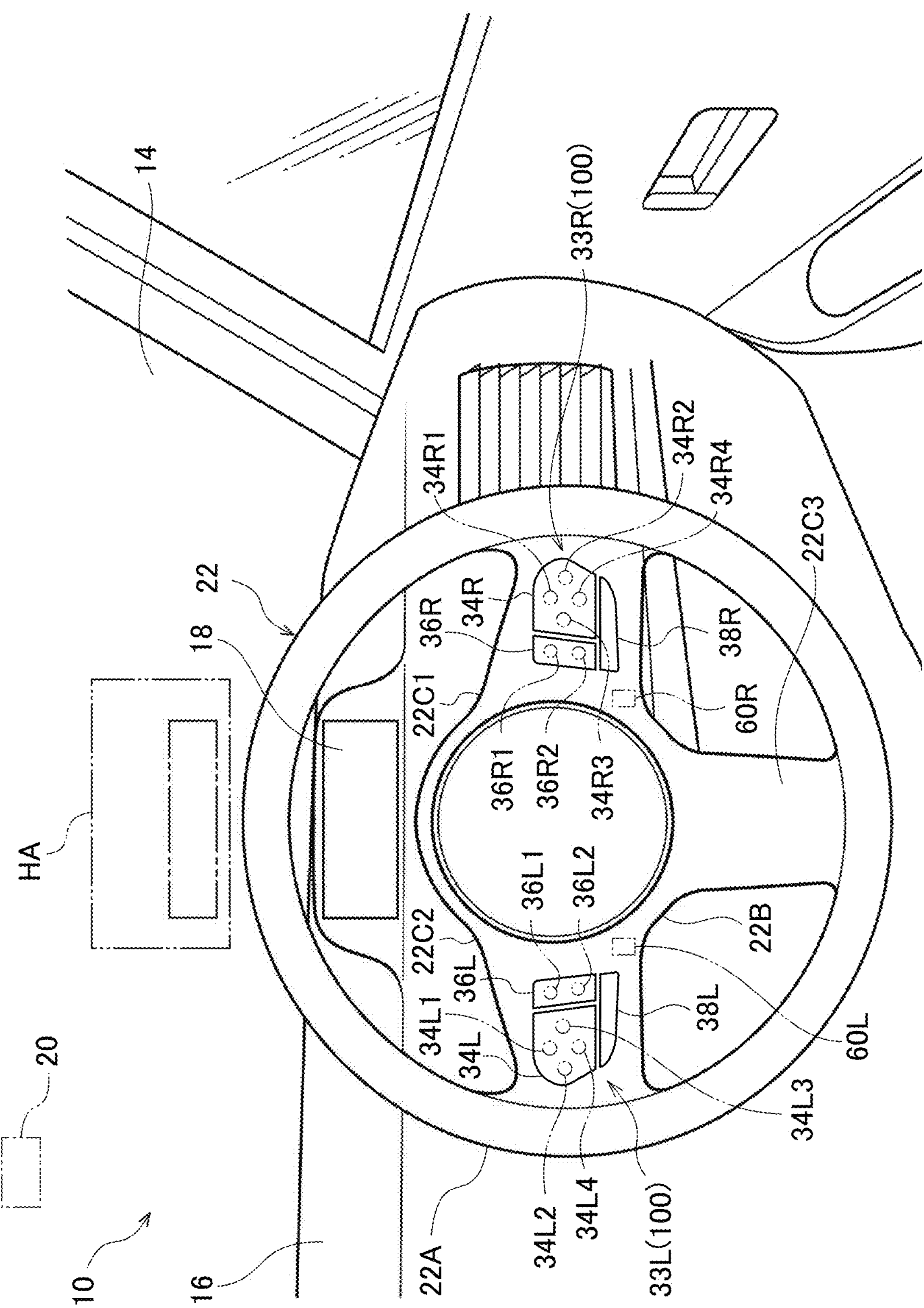
FIG. 1 is a diagram illustrating an interior of a vehicle equipped with a vehicle operation input device according to an exemplary embodiment.

A vehicle 10 of the present exemplary embodiment is, as illustrated in FIG. 1, equipped with a front windshield 14 and an instrument panel 16. A meter display (MET) 18 is provided on the instrument panel 16. A sensor cluster 20 is provided at an upper portion of a vehicle inside face of the front windshield 14. The sensor cluster 20 includes at least one out of a camera, a laser imaging detection and ranging (LIDAR) sensor, a locator camera, or a millimeter wave radar sensor.

Figure 4:
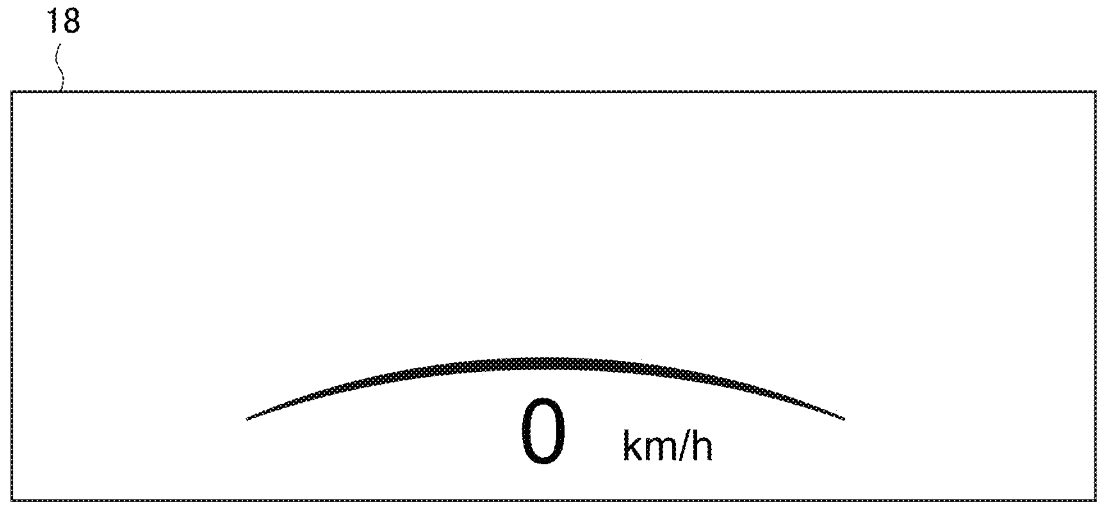
FIG. 4 is a diagram illustrating a meter display with a prescribed message displayed thereon.

The meter display 18 provided on the instrument panel 16 is controlled by a display control ECU 26, described later. The display control ECU 26 is connected to various meter instruments installed in the vehicle 10. Information related to a vehicle speed of the vehicle 10 is accordingly displayed on the meter display 18, for example as illustrated in FIG. 4.

Figure 2:
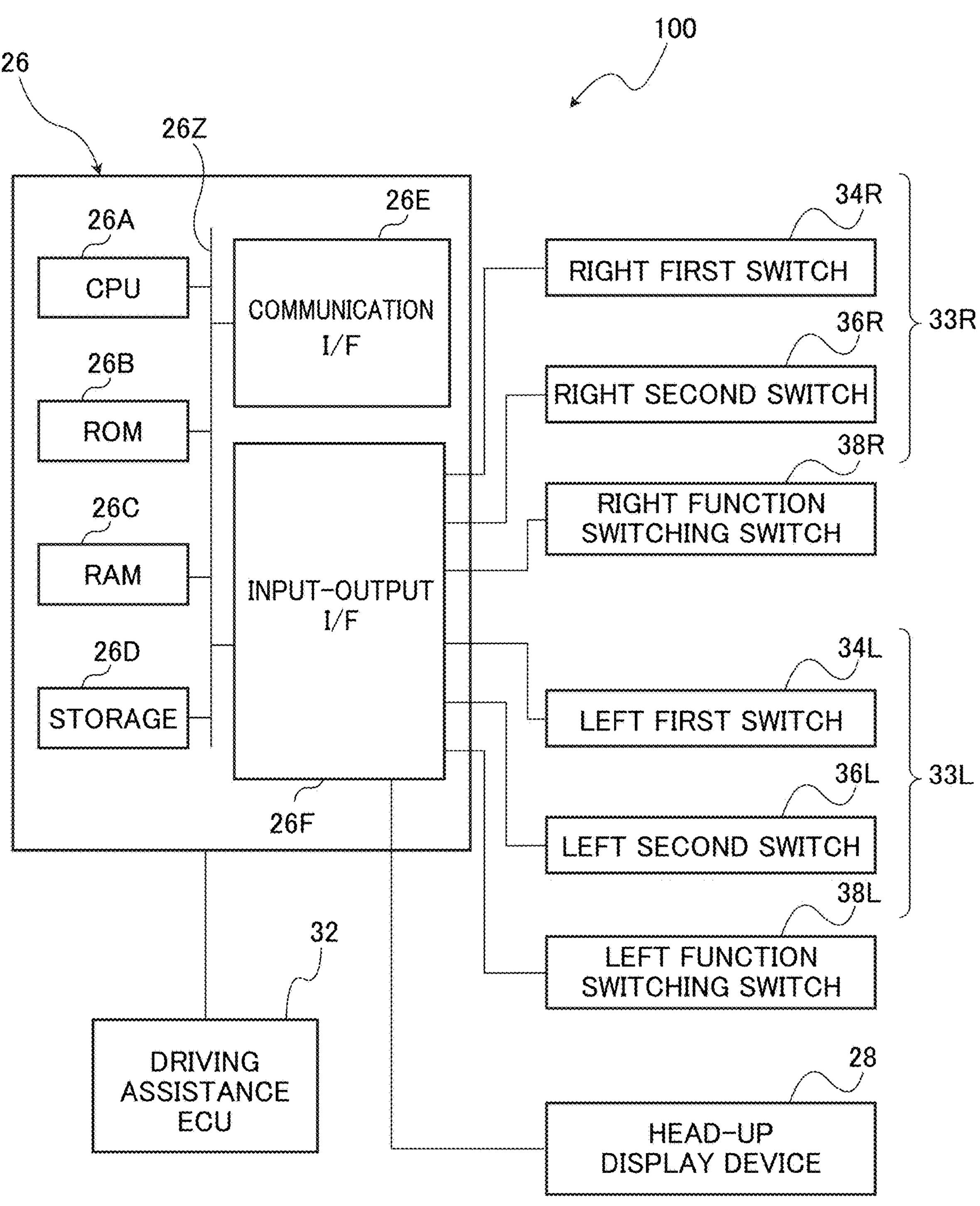
FIG. 2. is a diagram illustrating a hardware configuration of the vehicle illustrated in FIG. 1.
Figure 5:
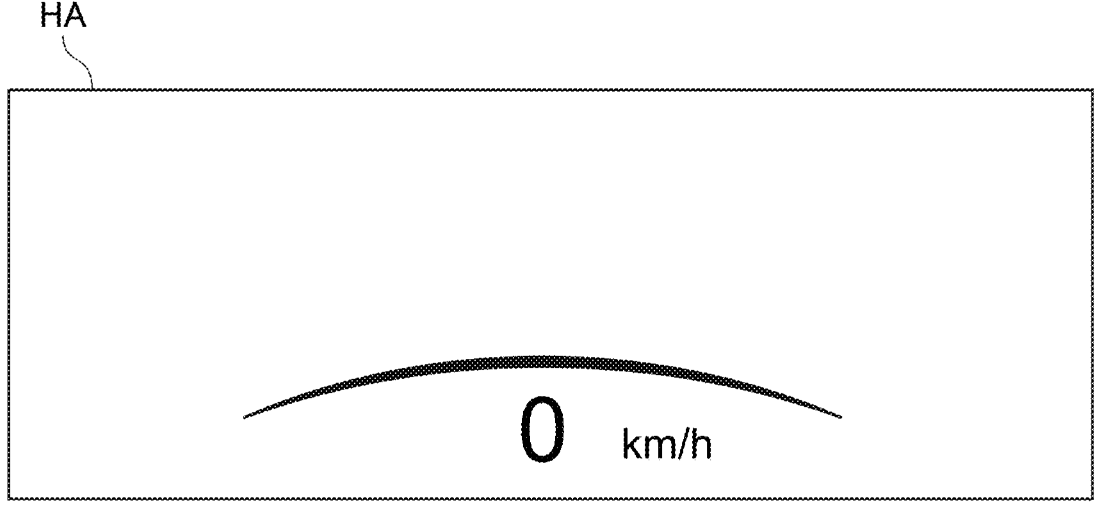
FIG. 5 is a diagram illustrating a display area of a head-up display with a prescribed message displayed thereon.

A display area (display section) HA is formed on the front windshield 14. The display area HA is provided at a vehicle upper side of the meter display 18. An image generated by a projection device of a head-up display (hereinafter HUD) 28 (see FIG. 2) provided to the vehicle 10 is projected onto the display area HA. The HUD 28 is connected to the display control ECU 26, as illustrated in FIG. 2. Thus information related to the vehicle speed of the vehicle 10 is displayed on the display area HA, such as illustrated in FIG. 5.

As illustrated in FIG. 1, a steering wheel 22 is supported by the instrument panel 16 so as to be able to rotate. The steering wheel 22 is equipped with a rim section 22A, a hub section 22B, and spoke sections 22C1, 22C2, 22C3. The hub section 22B is provided at the inner peripheral side of the substantially ring shaped rim section 22A. The inner peripheral section of the rim section 22A and the hub section 22B are linked together by the three spoke sections 22C1, 22C2, 22C3. A steering switch (first operation section) (input section) (state switching section) 33R is provided to the right side spoke section 22C1, and a steering switch (second operation section) (input section) (state switching section) 33L is provided to the left side spoke section 22C2. The steering switch 33R includes a right first switch 34R, a right second switch 36R, and a right function switching switch 38R, which are each independent of each other. The steering switch 33L includes a left first switch 34L, a left second switch 36L, and a left function switching switch 38L, which are each independent of each other. In the present exemplary embodiment the display control ECU 26, the steering switch 33R, and the steering switch 33L are configuration elements of a vehicle operation input device 100. Non-illustrated electrostatic sensors are mounted to the right first switch 34R, the right second switch 36R, the right function switching switch 38R, the left first switch 34L, the left second switch 36L, and the left function switching switch 38L.

The substantially rectangular shaped right first switch 34R is able to swing about a swinging center (non-illustrated in the drawings) provided at a center portion thereof. The right first switch 34R is equipped with a first input section 34R1, a second input section 34R2, a third input section 34R3, and a fourth input section 34R4 positioned at the peripheral outside of the swinging center. The first input section 34R1, the second input section 34R2, the third input section 34R3, and the fourth input section 34R4 have mutually different functions. By swinging the right first switch 34R, the first input section 34R1, the second input section 34R2, the third input section 34R3, and the fourth input section 34R4 move by a small distance in a direction substantially parallel to a front-rear direction between an initial position and a pressed position. The first input section 34R1, the second input section 34R2, the third input section 34R3, or the fourth input section 34R4 are positioned in the initial position when no external force is given to the right first switch 34R, or when part of the body of an occupant has touched the first input section 34R1, the second input section 34R2, the third input section 34R3, or the fourth input section 34R4. An occupant in the present specification is, for example, a driver.

The substantially rectangular shaped right second switch 36R positioned at the left hand side of the right first switch 34R is able to swing about a swinging center (non-illustrated in the drawings) provided at a center portion thereof. The right second switch 36R is equipped with a first input section 36R1 and a second input section 36R2 respectively positioned at upper and lower sides of the swinging center. The first input section 36R1 and the second input section 36R2 have mutually different functions. By swinging the right second switch 36R, the first input section 36R1 and the second input section 36R2 are moved by a small distance in directions substantially parallel to a front-rear direction between an initial position and a pressed position. The first input section 36R1 and the second input section 36R2 are positioned at the initial position when no external force is given to the right second switch 36R, or when the part of the body of the occupant has touched the first input section 36R1 or the second input section 36R2.

The right function switching switch 38R positioned below the right first switch 34R and the right second switch 36R is a switch for switching the functions assigned to the right first switch 34R and the right second switch 36R. The right function switching switch 38R is able to move by a small distance in a direction substantially parallel to a front-rear direction between an initial position and a pressed position. The right function switching switch 38R is positioned in the initial position when no external force is given to the right function switching switch 38R or when part of the body of the occupant has touched the right function switching switch 38R. The functions assigned to the right first switch 34R and the right second switch 36R are switched when, as described later, a second operation is performed on the right function switching switch 38R that is in an input enabled state. As an example of the present exemplary embodiment, the first input section 34R1, the second input section 34R2, the third input section 34R3, and the fourth input section 34R4 of the right first switch 34R, and also the first input section 36R1 and the second input section 36R2 of the right second switch 36R, are each assigned with two functions.

The left first switch 34L is configured similarly to the right first switch 34R, except in that there is left-right symmetry therebetween. Namely, the left first switch 34L is able to swing about a swinging center, and includes a first input section 34L1, a second input section 34L2, a third input section 34L3, and a fourth input section 34L4 that are movable between an initial position and a pressed position. The first input section 34L1, the second input section 34L2, the third input section 34L3, and the fourth input section 34L4 have mutually different functions.

The left second switch 36L is configured similarly to the right second switch 36R, except in that there is left-right symmetry therebetween. Namely, the left second switch 36L is able to swing about a swinging center, and includes a first input section 36L1 and a second input section 36L2. The first input section 36L1 and the second input section 36L2 have mutually different functions.

The left function switching switch 38L is configured similarly to the right function switching switch 38R except in that there is left-right symmetry therebetween. Namely, the left function switching switch 38L is a switch for switching functions assigned to the first input section 34L1, the second input section 34L2, the third input section 34L3, and the fourth input section 34L4 of the left first switch 34L and functions assigned to the first input section 36L1 and the second input section 36L2 of the left second switch 36L.

Note that in the present specification, reference to when part of the body of an occupant touches the first input section 34R1 of the right first switch 34R means part of the body of the occupant touches the first input section 34R1 and the first input section 34R1 is positioned at the initial position. Similar applies to the second input section 34R2, the third input section 34R3, the fourth input section 34R4, the right second switch 36R (first input section 36R1, second input section 36R2), the right function switching switch 38R, the left first switch 34L (first input section 34L1, second input section 34L2, third input section 34L3, fourth input section 34L4), the left second switch 36L (first input section 36L1, second input section 36L2), and the left function switching switch 38L.

Furthermore, in the present specification part of the body means a site on the body that an electrostatic sensor will be responsive to. For example, a hand is a part of the body. Furthermore, sometimes part of a body of an occupant touching and operating at least one out of the right first switch 34R, the right second switch 36R, the right function switching switch 38R, the left first switch 34L, the left second switch 36L, or the left function switching switch 38L is referred to as a "first operation (input operation)".

Furthermore, in the present specification an operation in which the first input section 34R1, the second input section 34R2, the third input section 34R3, or the fourth input section 34R4 of the steering switch 33R is moved to the pressed position by the part of the body of the occupant is sometimes called a "second operation". An operation in which the right second switch 36R (the first input section 36R1, the second input section 36R2), the right function switching switch 38R, the left first switch 34L (the first input section 34L1, the second input section 34L2, the third input section 34L3, the fourth input section 34L4), the left second switch 36L (the first input section 36L1, the second input section 36L2), and the left function switching switch 38L is moved to the pressed position is also sometimes called the "second operation".

Note that in cases in which the second operation has been performed on the steering switch 33R, the first operation is performed on the steering switch 33R at an initial stage of the second operation. Similarly, in cases in which the second operation has been performed on the steering switch 33L, the first operation is performed on the steering switch 33L at an initial stage of the second operation.

Figure 6:
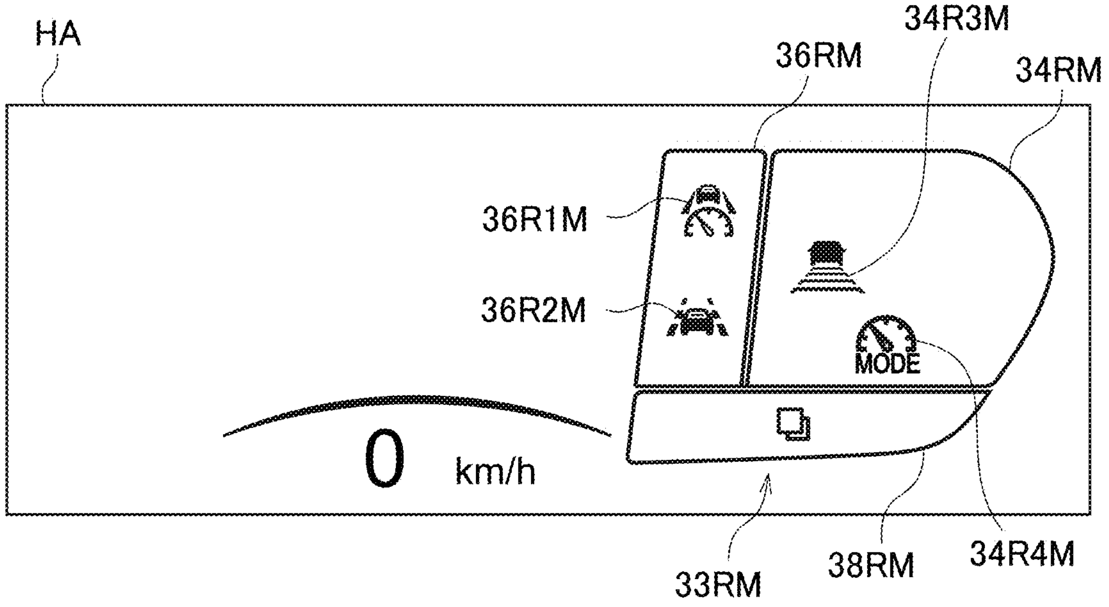
FIG. 6 is a diagram illustrating a display area of the head-up display when a driver has performed a first operation.
Figure 7:
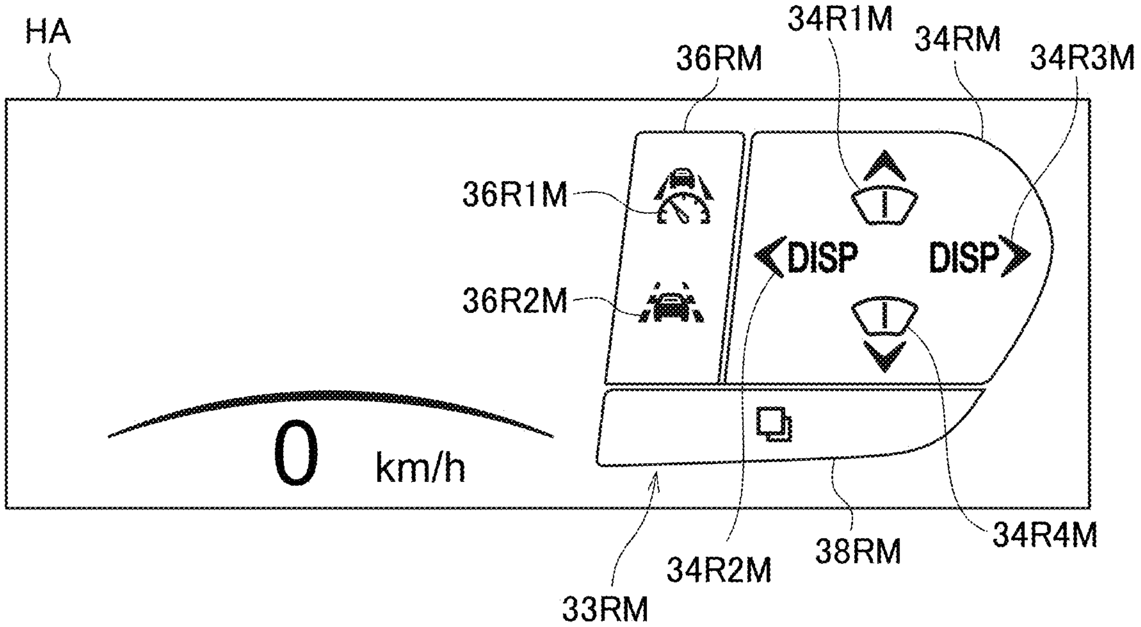
FIG. 7 is a diagram illustrating the display area of the head-up display when a driver has performed a function switching operation.

Moreover, sometimes the part of the body of the occupant continues to position the steering switch 33R or the steering switch 33L in the pressed position for a period of time exceeding a prescribed first threshold. Data related to the first threshold may, for example, be recorded in ROM 26B or storage 26D of the display control ECU 26, described later. The first threshold is, for example, 2 seconds. Such an operation on the steering switch 33R or the steering switch 33L is sometimes referred to as a "third operation (specific operation)". As described later, the steering switch 33R or the steering switch 33L on which the third operation was performed becomes in the input enabled state in cases in which the third operation was performed on the steering switch 33R or the steering switch 33L while a steering switch image 33RM representing the function of the steering switch 33R (information relating to an input section) and a steering switch image representing the function of the steering switch 33L (information relating to an input section) (not illustrated in the drawings) were not being displayed on the display area HA. As illustrated in FIG. 6 and FIG. 7, the steering switch image 33RM includes a right first switch image 34RM, a right second switch image 36RM, and a right function switching switch image 38RM respectively representing the right first switch 34R, the right second switch 36R, and the right function switching switch 38R. Note that in cases in which the third operation has been performed on the steering switch 33R, the first operation and the second operation have been performed on the steering switch 33R in the initial stage of the third operation. Similarly, in cases in which the third operation has been performed on the steering switch 33L, the first operation and the second operation have been performed on the steering switch 33L at the initial stage of the third operation.

The steering switch 33R and the steering switch 33L are switched to the input disabled state in cases in which the steering switch image 33RM and the steering switch image representing the function of the steering switch 33L are not being displayed on the display area HA.

The display control electronic control unit (ECU) 26 illustrated in FIG. 2 is provided to the vehicle 10. The display control ECU 26 is configured including a central processing unit (CPU: processor) 26A, a read only memory (ROM) 26B, a random access memory (RAM) 26C, a storage 26D, a communication interface (communication I/F) 26E, and an input-output interface (input-output I/F) 26F. These configuration elements are connected together through an internal bus 26Z so as to be able to communicate with each other.

The CPU 26A is a central processing unit that executes various programs to control each section. Namely, the CPU 26A reads programs from the ROM 26B or the storage 26D and executes the programs using the RAM 26C as workspace. The CPU 26A controls each of the configuration elements and performs various arithmetical processing according to the programs recorded on the ROM 26B or the storage 26D.

The ROM 26B is stored with various programs and various data. The RAM 26C serves as workspace and is temporarily stored with programs and data. The storage 26D is configured by a hard disk drive (HDD) or a solid state drive (SSD), and is stored with various programs including an operating system and various data. In the present exemplary embodiment the program for performing input control processing and the like is stored on the ROM 26B (non-transitory recording medium (recording medium)) or in the storage 26D (non-transitory recording medium (recording medium)).

The communication interface 26E is an interface for the display control ECU 26 to communicate with an external server and other equipment. A standard such as, for example, controller area network (CAN), Ethernet (registered trademark), long term evolution (LTE), fiber distributed data interface (FDDI), Wi-Fi (registered trademark) or the like is employed in the communication interface 26E.

The right first switch 34R, the right second switch 36R, the right function switching switch 38R, the left first switch 34L, the left second switch 36L, the left function switching switch 38L, and the HUD 28 are electrically connected to the input-output I/F 26F.

The display control ECU 26 is electrically connected to a driving assistance ECU 32. The driving assistance ECU 32 is configured including a CPU (processor), ROM, RAM, storage, a communication interface (communication I/F), and an input-output interface (input-output I/F). These configuration elements are connected together through an internal bus so as to be able to communicate with each other. The driving assistance ECU 32 of the present exemplary embodiment is connected to the sensor cluster 20, and to various actuators for driving a brake device, a steering device, and an internal combustion engine (drive source). The driving assistance ECU 32 may also be connected to an electric motor (drive source). The driving assistance ECU 32 includes a function to execute driving assistance control of the vehicle 10 by controlling the actuators (and electric motor) described above. In the present specification "driving assistance control" includes driving assistance control of level 1 to level 5 automation in the driving automation scale as defined by the Society of Automotive Engineers (SAE). The driving assistance control includes, for example, adaptive cruise control (ACC) and lane tracing assist (LTA).

The display control ECU 26 employs the hardware resources described above to implement various functions. The functional configuration implemented by the display control ECU 26 will now be described, with reference to FIG. 3.

Figure 3:
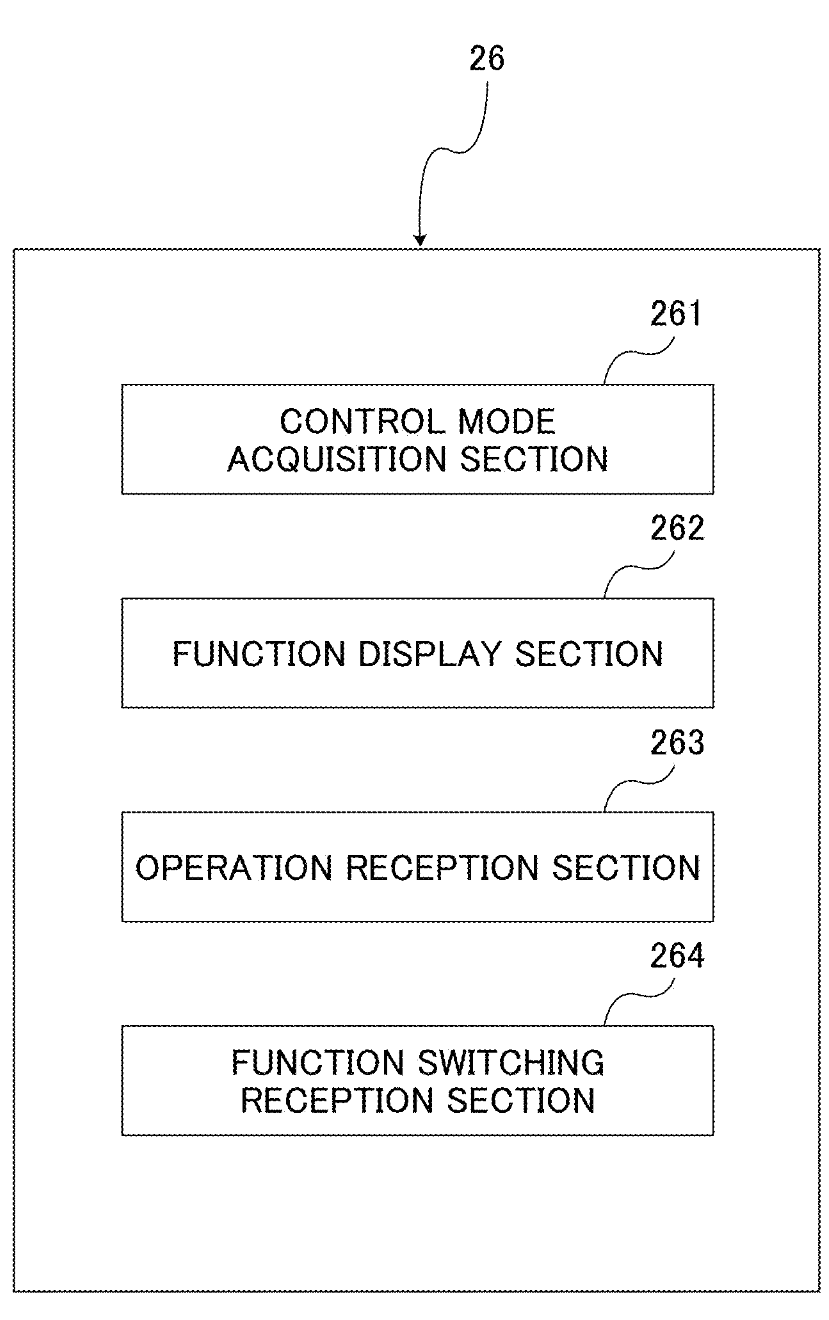
FIG. 3 is a functional block diagram of a display control ECU of the vehicle.

As illustrated in FIG. 3, the display control ECU 26 includes, as functional configuration, a control mode acquisition section 261, a function display section 262, an operation reception section 263, and a function switching reception section 264. The control mode acquisition section 261, the function display section 262, the operation reception section 263, and the function switching reception section 264 are implemented by the CPU 26A reading a program stored on the ROM 26B or the storage 26D and executing the program.

The control mode acquisition section 261 acquires content of driving assistance control being executed by the driving assistance ECU 32.

When the third operation has been performed on the steering switch 33R or the steering switch 33L while the steering switch 33R and the steering switch 33L are in the input disabled state, the function display section 262 controls the HUD 28 to cause an image representing the function assigned to the steering switch 33R or the steering switch 33L on which the third operation was performed to be displayed on the display area HA. For example, as illustrated in FIG. 6 and FIG. 7, the function display section 262 displays the steering switch image 33RM on the display area HA when the third operation has been performed on the steering switch 33R. Namely, in such cases the steering switch 33R is switched to the input enabled state by the function display section 262.

Furthermore when, while in a state in which a steering switch image representing one out of the steering switch 33R or the steering switch 33L is being displayed on the display area HA, the first operation has been performed on the other thereof, the function display section 262 displays the steering switch image representing the other thereof on the display area HA. For example, when the first operation has been performed on the steering switch 33R in a state in which the steering switch image representing the steering switch 33L is being displayed on the display area HA, the function display section 262 clears the steering switch image representing the steering switch 33L from the display area HA and displays the steering switch image 33RM on the display area HA instead. When doing so the steering switch 33L is switched to the input disabled state by the function display section 262 and the steering switch 33R is switched to the input enabled state thereby. This means that the steering switch image 33RM and the steering switch image corresponding to the left function switching switch 38L are not both displayed on the display area HA at the same time.

Furthermore, when the part of the body of the occupant has touched the steering switch 33R or the steering switch 33L while in the input enabled state, the function display section 262 continues to display the steering switch image representing the steering switch 33R or the steering switch 33L in the input enabled state on the display area HA, as illustrated in FIG. 6 and FIG. 7. When the part of the body of the occupant moves away from the steering switch 33R or the steering switch 33L that is in the input enabled state, and the first operation is not performed on this steering switch for a period of time from when moving away occurred until the prescribed set display time (third threshold) elapses, the function display section 262 clears the steering switch image representing this steering switch from the display area HA. Namely, the steering switch 33R and the steering switch 33L are switched to the input disabled state by the function display section 262. The set display time is, for example, 5 seconds.

Moreover, when the part of the body of the occupant has touched the left first switch 34L, the left second switch 36L, or the left function switching switch 38L while in the input enabled state, the function display section 262 continues to display the steering switch image representing the steering switch 33L on the display area HA. When the part of the body of the occupant moves away from the steering switch 33L, and the first operation is not performed on the steering switch 33L for the period of time from when moving away occurred until the prescribed set display time elapses, the function display section 262 clears this steering switch image from the display area HA. The set display time is, for example, 5 seconds.

The steering switch image 33RM and the steering switch image corresponding to the steering switch 33L are not displayed on the display area HA when, as illustrated in FIG. 5, the steering switch 33R and the steering switch 33L are in the input disabled state. In such cases only the information related to the vehicle speed of the vehicle 10 is displayed on the display area HA.

FIG. 6 includes, in the right first switch image 34RM, a third input section image 34R3M representing the third input section 34R3 and a fourth input section image 34R4M representing the fourth input section 34R4. Specific functions are respectively assigned to the third input section 34R3 and the fourth input section 34R4 in such cases. However, respective functions are not assigned to the first input section 34R1 and the second input section 34R2. Thus in such cases images representing the first input section 34R1 and the second input section 34R2 are not included in the right first switch image 34RM.

A function to set an inter-vehicle distance between the vehicle 10 and a leading vehicle positioned in front of the vehicle 10 is assigned to the third input section 34R3 in this example. A value set for the inter-vehicle distance is accordingly changed by the part of the body of the occupant moving the third input section 34R3 to the pressed position while the steering switch image 33RM is being displayed on the display area HA.

A function related to switching control mode is assigned to the fourth input section 34R4 in this example. The control mode of the vehicle 10 is accordingly switched when the part of the body of the occupant moves the fourth input section 34R4 to the pressed position while the steering switch image 33RM is being displayed on the display area HA.

A function to switch a radar cruise mode to an ON state or an OFF state is assigned to the first input section 36R1. Thus the radar cruise mode is switched to the ON state or the OFF state by the part of the body of the occupant moving the first input section 36R1 to the pressed position while the steering switch image 33RM is being displayed on the display area HA.

A function to switch the LTA to an ON state or an OFF state is assigned to the second input section 36R2. The LTA is accordingly switched to the ON state or the OFF state by the part of the body of the occupant moving the second input section 36R2 to the pressed position while the steering switch image 33RM is being displayed on the display area HA.

The operation reception section 263 receives the first operation and the second operation on the right first switch 34R, the right second switch 36R, the left first switch 34L, or the left second switch 36L while in the input enabled state. However, the operation reception section 263 does not receive the first operation and the second operation on the right first switch 34R, the right second switch 36R, the left first switch 34L, or the left second switch 36L while in the input disabled state. For example, when the first operation is performed on the second input section 36R2 while the steering switch image 33RM is being displayed on the display area HA, the function of the second input section 36R2 is selected by the operation reception section 263, and emphasis display is performed on the second input section image 36R2M representing the second input section 36R2 in the display area HA. For example, when the first operation is performed on the second input section 36L2 while the steering switch image representing the steering switch 33L is being displayed on the display area HA, the function of the second input section 36L2 is selected by the operation reception section 263, and emphasis display is performed on the second input section image representing the second input section 36L2 (not illustrated in the drawings) in the display area HA. Moreover, for example, when the second operation is executed on the third input section 34R3 while the steering switch image 33RM is being displayed on the display area HA, the operation reception section 263 issues an instruction to another ECU (for example a driving assist ECU 32) so as to execute the function of the third input section 34R3. Moreover, for example when the second operation is executed on the third input section 34L3 while the steering switch image representing the steering switch 33L is being displayed on the display area HA, the operation reception section 263 issues an instruction to another ECU so as to execute the function of the third input section 34L3.

The function switching reception section 264 receives the second operation on the right function switching switch 38R in cases in which the steering switch image 33RM is being displayed on the display area HA. Furthermore, the function switching reception section 264 receives the second operation on the left function switching switch 38L in cases in which the steering switch image corresponding to the steering switch 33L is being displayed on the display area HA. Specifically, the function switching reception section 264 switches the functions of the right first switch 34R and the right second switch 36R when the second operation has been executed on the right function switching switch 38R while the steering switch image 33RM is in a displayed state on the display area HA. The function switching reception section 264 switches the functions of the left first switch 34L and the left second switch 36L when the second operation has been executed on the left function switching switch 38L while the steering switch image corresponding to the steering switch 33L is in a displayed state on the display area HA.

For example, when the second operation is executed on the right function switching switch 38R in the state illustrated in FIG. 6, the display area HA is transitioned by the function display section 262 to the state illustrated in FIG. 7. Namely, as illustrated in FIG. 7, a first input section image 34R1M, a second input section image 34R2M, a third input section image 34R3M, and a fourth input section image 34R4M are changed from the images displayed in FIG. 6. The occupant looking at the first input section image 34R1M, the second input section image 34R2M, the third input section image 34R3M, and the fourth input section image 34R4M is thereby able to perceive that the functions assigned to the first input section 34R1, the second input section 34R2, the third input section 34R3, and the fourth input section 34R4 have been switched.

Operation and Advantageous Effects

Next, description follows regarding the operation and advantageous effects of the present exemplary embodiment.

Figure 8:
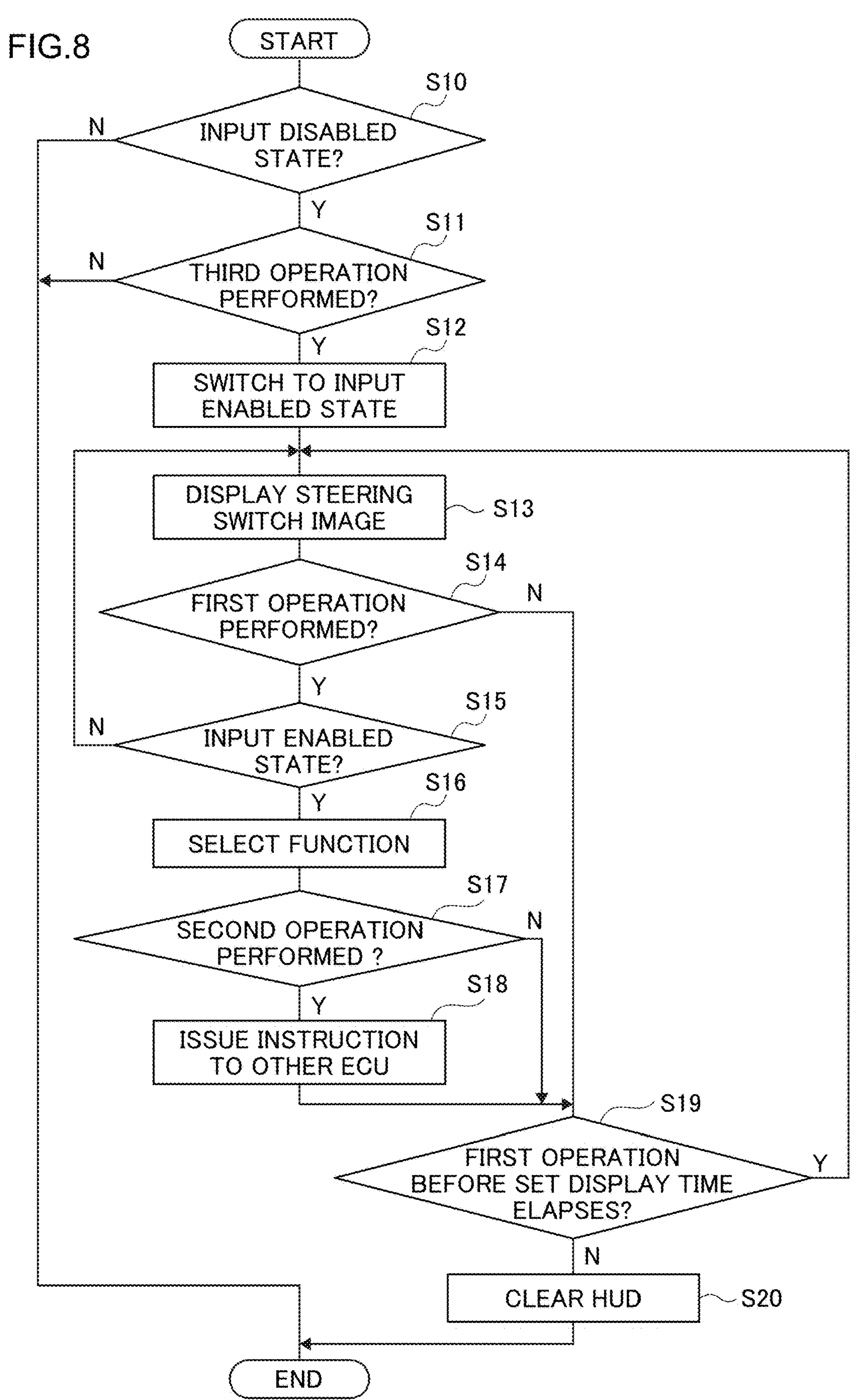
FIG. 8 is a flowchart representing processing executed by the display control ECU.

Next, description follows regarding processing executed by the display control ECU 26 of the vehicle 10, with reference to the flowchart of FIG. 8. The display control ECU 26 repeatedly executes the processing of the flowchart illustrated in FIG. 8 each time a prescribed period of time elapses.

At step S10, the display control ECU 26 determines whether or not the steering switch 33R and the steering switch 33L are in the input disabled state.

The display control ECU 26 proceeds to step S11 when determined YES at step S10, and determines whether or not the occupant has performed the third operation on the steering switch 33R or the steering switch 33L.

The display control ECU 26 proceeds to step S12 when determined YES at step S11, and switches the steering switch 33R or the steering switch 33L on which the third operation was performed to an input enabled state.

The display control ECU 26 proceeds to step S13 when the processing of step S12 has finished, and displays on the display area HA a steering switch image corresponding to the steering switch 33R or the steering switch 33L that has switched to the input enabled state. When this happens the display control ECU 26 also starts a count of the set display time of the displayed steering switch image.

The display control ECU 26 proceeds to step S14 when the processing of step S13 has finished, and determines whether or not the first operation has been performed on the steering switch 33R or the steering switch 33L after the steering switch 33R or the steering switch 33L on which the third operation was performed has returned to the initial position.

The display control ECU 26 proceeds to step S15 when determined YES at step S14, and determines whether or not the steering switch 33R or the steering switch 33L on which the first operation was performed is in the input enabled state.

The display control ECU 26 proceeds to step S16 when determined YES at step S15. For example, the function of the first input section 34R1 is selected at step S16 in cases in which the steering switch image 33RM was displayed at step S13 and the first operation was performed on the first input section 34R1 at step S14.

However, the display control ECU 26 proceeds to step S13 when determined NO at step S15. For example, in cases in which the steering switch 33L was switched to the input enabled state at step S12 and determination was NO at step S15, the steering switch image 33RM is then displayed on the display area HA at step S13.

The display control ECU 26 proceeds to step S17 when the processing of step S16 has finished. Suppose that the function of the first input section 34R1 has been selected at step S16. The display control ECU 26 proceeds to step S18 when the second operation is performed on the first input section 34R1 at step S17 in such cases.

In such cases the display control ECU 26 issues an instruction to another ECU at step S18. The function assigned to the first input section 34R1 is accordingly executed in cases in which the function of the first input section 34R1 has been selected at step S16.

The display control ECU 26 proceeds to step S19 when determined NO at step S17 or when the processing of step S18 has finished, and determines whether or not the first operation has been performed on the steering switch 33R or the steering switch 33L in a period of time from when the processing of step S13 was performed until the set display time elapses.

The display control ECU 26 proceeds to step S20 when determined NO at step S19, and the steering switch image corresponding to the steering switch 33R or the steering switch 33L being displayed on the display area HA is cleared by the display control ECU 26 controlling the HUD 28. The steering switch 33R and the steering switch 33L are then also switched to the input disabled state by the display control ECU 26.

The display control ECU 26 proceeds to step S13 when determined YES at step S19. For example, in cases in which the steering switch 33L has been switched to the input enabled state at step S12 and the first operation has been performed on the steering switch 33L in a period of time until the set display time elapses, at step S13 the steering switch image corresponding to the steering switch 33L continues to be displayed in the display area HA and a new count is started for the set display time of this steering switch image. However, for example, in cases in which the steering switch 33L has been switched to the input enabled state at step S12 and the first operation has been performed on the steering switch 33R in a period of time until the set display time elapses, at step S13 the steering switch image corresponding to the steering switch 33L is cleared from the display area HA. The steering switch image 33RM is moreover displayed on the display area HA, and the display control ECU 26 starts a count of the set display time of the steering switch image 33RM.

The display control ECU 26 temporarily ends the processing of the flowchart of FIG. 8 when determined NO at steps S10, S11, or when the processing of step S20 has finished.

Thus in the present exemplary embodiment as described above, when the occupant has performed the third operation on the steering switch 33R or the steering switch 33L while in a state in which the steering switch images corresponding to the steering switch 33R and the steering switch 33L are not being displayed on the display area HA, the steering switch 33R or the steering switch 33L that has had the third operation performed thereon becomes in the input enabled state. However, when the occupant has not performed the third operation on the steering switch 33R or the steering switch 33L while in a state in which the steering switch images corresponding to the steering switch 33R and the steering switch 33L are not being displayed on the display area HA, the steering switch 33R and the steering switch 33L are switched to the input disabled state. Thus the steering switch 33R and the steering switch 33L are not switched to the input enabled state unless the occupant has performed the third operation different to the first operation on the steering switch 33R or the steering switch 33L in this manner. Namely, the steering switch image corresponding to the steering switch 33R or the steering switch 33L is not displayed on the display area HA unless the third operation is performed on the steering switch 33R or the steering switch 33L.

Thus for the third operation to be performed by the occupant, normally the occupant needs to have the intention to display the steering switch image corresponding to the steering switch 33R or the steering switch 33L on the display area HA. This means that there is little concern that the steering switch image corresponding to the steering switch 33R or the steering switch 33L is displayed on the display area HA in cases in which the occupant does not have the intention to display the steering switch image corresponding to the steering switch 33R or the steering switch 33L in the display area HA. The occupant looking at the display area HA is accordingly not likely to feel annoyed.

Moreover, the operation reception section 263 receives the first operation on the steering switch 33R or the steering switch 33L in the input enabled state when the first operation, in which part of the body of the occupant touches the steering switch 33R or the steering switch 33L, has been performed on the steering switch 33R or the steering switch 33L in the input enabled state. The occupant is accordingly able to cause a prescribed switch to be emphasis displayed on the display area HA by a simple operation when the steering switch 33R or the steering switch 33L is in the input enabled state.

Moreover, in the present exemplary embodiment the third operation is an operation of continuing to position the steering switch 33R or the steering switch 33L in the pressed position for a period of time exceeding the first threshold. There is accordingly little concern that the occupant might perform the third operation mistakenly. There is accordingly little concern that the occupant might mistakenly display the steering switch image corresponding to the steering switch 33R or the steering switch 33L on the display area HA.

Moreover, when the occupant has not performed the first operation in a period of time from when the steering switch image corresponding to the steering switch 33R or the steering switch 33L was displayed on the display area HA until the set display time elapses, the steering switch image corresponding to the steering switch 33R or the steering switch 33L is cleared from the display area HA, and the steering switch 33R and the steering switch 33L are switched to the input disabled state. Namely, when the occupant does not have the intent to continue displaying the steering switch image corresponding to the steering switch 33R or the steering switch 33L on the display area HA, the steering switch image corresponding to the steering switch 33R and the steering switch 33L are cleared from the display area HA. The occupant looking at the display area HA is accordingly not likely to feel annoyed.

Furthermore in the present exemplary embodiment the steering switch 33R and the steering switch 33L are provided to the steering wheel 22. The occupant (driver) is accordingly able to operate the steering switch 33R and the steering switch 33L easily.

Moreover in the present exemplary embodiment when, in a displayed state of the steering switch image representing one out of the steering switch 33R or the steering switch 33L on the display area HA, the occupant has performed the first operation on the other out of the steering switch 33R or the steering switch 33L, the steering switch image representing the one is cleared from the display area HA and the steering switch image representing the other is displayed thereon. This means that in a state in which the steering switch image representing the one is being displayed on the display area HA, the occupant causes the steering switch image representing the other to be displayed on the display area HA using a simple operation.

Although explanation has been given above of a vehicle operation input device, a vehicle operation input method, and a non-transitory recording medium according to exemplary embodiments, the vehicle operation input device, the vehicle operation input method, and the non-transitory recording medium may be implemented with appropriate design modifications within a range not departing from the scope of the present disclosure.

For example, the third operation may be an operation in which part of the body of the occupant continues to touch the steering switch 33R or the steering switch 33L for a time exceeding a prescribed second threshold. There is little concern that the occupant might perform the third operation mistakenly in this modified example too. This enables a reduction in concern that the occupant might mistakenly display the steering switch image corresponding to the steering switch 33R or the steering switch 33L on the display area HA.

Moreover, the third operation may be an operation to intermittently touch the right function switching switch 38R or the left function switching switch 38L plural times over a short period of time using part of the body of an occupant. In such cases the short period of time is, for example, 1 second, and the plural times is, for example, three times. There is little concern that the occupant might perform the third operation mistakenly in such a modified example too. This enables a reduction in concern that the occupant might mistakenly display the steering switch image corresponding to the steering switch 33R or the steering switch 33L on the display area HA.

As illustrated by the double-dot broken lines in FIG. 1, a state switching switch 60R and a state switching switch 60L may be provide to the steering wheel 22, separately to the steering switch 33R and the steering switch 33L. In this modified example the display control ECU 26, the steering switch 33R, the steering switch 33L, the state switching switch 60R, and the state switching switch 60L are configuration elements of the vehicle operation input device 100. The state switching switch 60R and the state switching switch 60L are movable between an initial position and a pressed position. The state switching switch 60R and the state switching switch 60L are positioned in the initial position when external force is not being given to the state switching switch 60R and the state switching switch 60L. In the present modified example an operation by part of the body of the occupant moving the state switching switch 60R and the state switching switch 60L from the initial position to the pressed position is a “specific operation”. In such cases the steering switch 33R is switched to the input enabled state by the display control ECU 26 when the state switching switch 60R has been moved to the pressed position by the part of the body of the occupant when the steering switch 33R and the steering switch 33L were in the input disabled state. Similarly, the steering switch 33L is switched to the input enabled state by the display control ECU 26 when the state switching switch 60L has been moved to the pressed position by the part of the body of the occupant when the steering switch 33R and the steering switch 33L were in the input disabled state. In this modified example the steering switches 33R, 33L are each respectively different to the state switching switches 60R, 60L. This means that there is a need for the occupant to move the state switching switch 60R or the state switching switch 60L to the pressed position in order to display the steering switch image corresponding to the steering switch 33R or the steering switch 33L on the display area HA that is not displaying the steering switch image corresponding to the steering switch 33R and the steering switch 33L. Thus in order for the occupant to perform such an operation, normally the occupant needs to have the intention to display the steering switch image corresponding to the steering switch 33R or the steering switch 33L on the display area HA. This means that there is little concern that the steering switch image corresponding to the steering switch 33R or the steering switch 33L is displayed on the display area HA in cases in which the occupant does not have the intention to display the steering switch image corresponding to the steering switch 33R or the steering switch 33L in the display area HA. The occupant looking at the display area HA is accordingly not likely to feel annoyed.

A configuration may be adopted in which the steering switch image 33RM or the steering switch image corresponding to the steering switch 33L is displayed at the same time both on the meter display (display section) 18 and on the display area HA when the specific operation has been performed. Moreover, the steering switch image 33RM or the steering switch image corresponding to the steering switch 33L may be displayed only on the meter display 18 when the specific operation has been performed.

Alternatively the steering switch image 33RM and the steering switch image corresponding to the steering switch 33L may both be displayed at the same time on at least one out of the meter display 18 or the display area HA when the specific operation has been performed.

The steering switch 33R and the steering switch 33L may also be provided to the steering wheel 22 such that the steering switch 33R is positioned on the left side of the steering switch 33L.

Moreover, the steering wheel 22 may be provided with only one out of the steering switch 33R or the steering switch 33L.

At least one member from out of a member corresponding to the steering switch 33R and a member corresponding to the steering switch 33L may be provided at a different site to a site on the steering wheel 22 of the vehicle 10.

What is claimed is:

1. A vehicle operation input device comprising:

an input section on which an input operation is performed, the input operation being an operation in which a part of a body of an occupant of a vehicle touches the input section;

a state switching section configured to be operated by the occupant; and a processor, wherein:

when the occupant has performed a specific operation that is an operation different from the input operation on the state switching section while in a state in which a display section capable of displaying information related to the input section is not displaying the information, the processor causes the information to be displayed on the display section and places the input section in an input enabled state in which the input operation is receivable; and when the occupant has not performed the specific operation on the state switching section while in state in which the information is not being displayed on the display section, the processor does not cause the information to be displayed on the display section.

2. The vehicle operation input device of claim 1, wherein the state switching section is the input section.

3. The vehicle operation input device of claim 1, wherein:

the state switching section, which is the input section, is able to move between an initial position that is a position when not imparted with an external force and a pressed position; and the specific operation is an operation of continuing to position the input section in the pressed position for a period of time exceeding a first threshold.

4. The vehicle operation input device of claim 1, wherein:

the state switching section is the input section; and the specific operation is an operation in which the part of the body of the occupant continues to touch the input section for a period of time exceeding a second threshold.

5. The vehicle operation input device of claim 1, wherein the input section and the state switching section are different from each other.

6. The vehicle operation input device of claim 1, wherein the processor is configured to clear the information from the display section and to switch the input section to the input disabled state when the occupant has not performed the input operation in a period of time from when the information was displayed on the display section until a third threshold elapses.

7. The vehicle operation input device of claim 1, wherein the input section and the state switching section are provided at a steering wheel of the vehicle.

8. The vehicle operation input device of claim 7, wherein a first operation section equipped with the input section and the state switching section, and a second operation section equipped with the input section and the state switching section and positioned at a left side or a right side of the first operation section, are both provided at the steering wheel.

9. The vehicle operation input device of claim 8, wherein the processor displays information related to the input section of the first operation section on the display section when the occupant has performed the specific operation on the state switching section of the first operation section.

10. The vehicle operation input device of claim 9, wherein the processor causes information related to the input section of the second operation section to be displayed on the display section when the occupant has performed the input operation on the input section of the second operation section while in a state in which information related to the input section of the first operation section is being displayed on the display section.

11. A vehicle operation input method comprising:

when an occupant of a vehicle has, while in a state in which a display section capable of displaying information related to an input section on which an input operation is performed by the occupant is not displaying the information, performed a specific operation that is an operation different from the input operation on the state switching section, a processor causing the information to be displayed on the display section and placing the input section in an input enabled state in which the input operation is receivable; and when the occupant has not performed the specific operation on the state switching section while in state in which the information is not being displayed on the display section, the processor not causing the information to be displayed on the display section.

12. A non-transitory recording medium storing a program executable by a computer so as to perform processing, the processing comprising:

when an occupant of a vehicle has, while in a state in which a display section capable of displaying information related to an input section on which an input operation is performed by the occupant is not displaying the information, performed a specific operation that is an operation different from the input operation on a state switching section, displaying the information on the display section and placing the input section in an input enabled state in which the input operation is receivable; and when the occupant has not performed the specific operation on the state switching section while in state in which the information is not being displayed on the display section, not displaying the information on the display section.

* * * * *